(12) United States Patent
Pfister

(10) Patent No.: US 11,461,897 B2
(45) Date of Patent: Oct. 4, 2022

(54) METHOD AND ANALYSIS DEVICES FOR CLASSIFYING TISSUE SAMPLES

(71) Applicant: Siemens Healthcare GmbH, Erlangen (DE)

(72) Inventor: Marcus Pfister, Bubenreuth (DE)

(73) Assignee: Siemens Healthcare GmbH, Erlangen (DE)

( * ) Notice: Subject to any disclaimer, the term of this patent is extended or adjusted under 35 U.S.C. 154(b) by 810 days.

(21) Appl. No.: 16/355,693

(22) Filed: Mar. 15, 2019

(65) Prior Publication Data

US 2019/0287246 A1 Sep. 19, 2019

(30) Foreign Application Priority Data

Mar. 16, 2018 (EP) .................................. 18162285

(51) Int. Cl.
| | | |
|---|---|---|
| *G06T 7/00* | (2017.01) | |
| *G06T 7/143* | (2017.01) | |
| *G06K 9/62* | (2022.01) | |
| *G06V 10/10* | (2022.01) | |
| *G06V 10/44* | (2022.01) | |
| *G06V 20/69* | (2022.01) | |

(52) U.S. Cl.
CPC ............ *G06T 7/0014* (2013.01); *G06K 9/627* (2013.01); *G06K 9/6262* (2013.01); *G06T 7/0012* (2013.01); *G06T 7/143* (2017.01); *G06V 10/17* (2022.01); *G06V 10/454* (2022.01); *G06V 20/695* (2022.01); *G06V 20/698* (2022.01); *G06T 2207/20081* (2013.01); *G06T 2207/20084* (2013.01); *G06T 2207/30096* (2013.01); *G06V 2201/03* (2022.01)

(58) Field of Classification Search
CPC ..... G06T 7/0014; G06T 7/143; G06T 7/0012; G06T 2201/03; G06T 2207/20081; G06T 2207/20084; G06T 2207/30096; G06V 20/695; G06V 20/698; G06V 10/17; G06V 10/454; G06K 9/6262; G06K 9/627
USPC ........... 702/21; 382/128, 133, 155, 156, 159
See application file for complete search history.

(56) References Cited

U.S. PATENT DOCUMENTS

| | | | |
|---|---|---|---|
| 2005/0010102 A1* | 1/2005 | Marchesini ............ | A61B 5/445 128/920 |
| 2012/0282648 A1* | 11/2012 | Simon .............. | G01N 33/57434 435/29 |
| 2015/0317509 A1* | 11/2015 | Kil ........................... | G06T 7/11 382/133 |

FOREIGN PATENT DOCUMENTS

| | | |
|---|---|---|
| WO | WO2017103196 A1 | 6/2017 |
| WO | WO2018060243 A1 | 4/2018 |

OTHER PUBLICATIONS

European Office Action for European Patent Application No. 18162285. 3-1207, dated Sep. 27, 2018.

(Continued)

*Primary Examiner* — Gabriel I Garcia
(74) *Attorney, Agent, or Firm* — Lempia Summerfield Katz LLC

(57) ABSTRACT

A method and analysis devices for classifying tissue samples are provided. In the method, annotated training data is generated from a known positive tissue sample and a known negative tissue sample from a patient, and the annotated training data is then used to train an automatic classifier patient-specifically. To delimit an affected tissue region of (Continued)

the patient, then, unknown tissue samples from the same patient are classified by the automatic classifier trained for the patient.

11 Claims, 2 Drawing Sheets

(56) References Cited

OTHER PUBLICATIONS

Litjens, Geert, et al. "Deep learning as a tool for increased accuracy and efficiency of histopathological diagnosis." Scientific reports 6 (2016): pp. 1-11.

Pfister, Marcus, and Raul Rojas. "Speeding-up backpropagation—A comparison of orthogonal techniques." Proceedings of 1993 International Conference on Neural Networks (IJCNN-93—Nagoya, Japan). vol. 1. IEEE, 1993. pp 1-8.

* cited by examiner

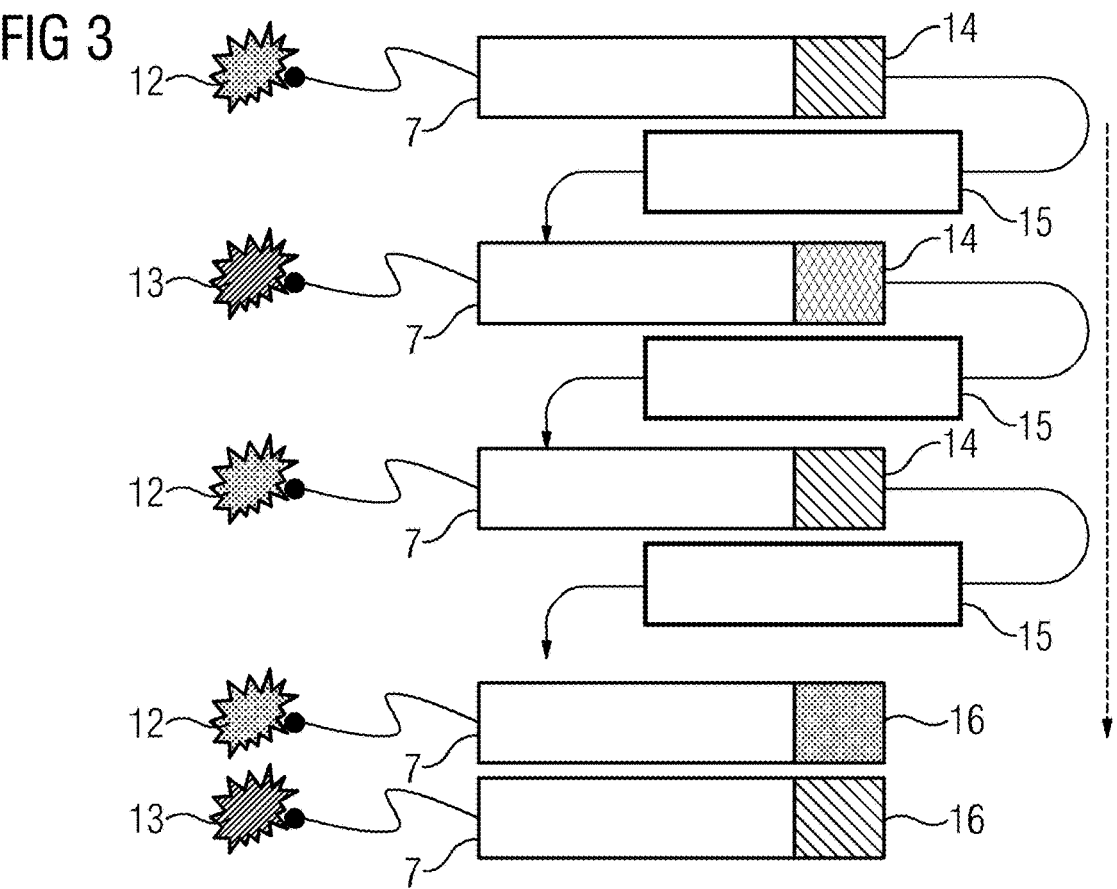
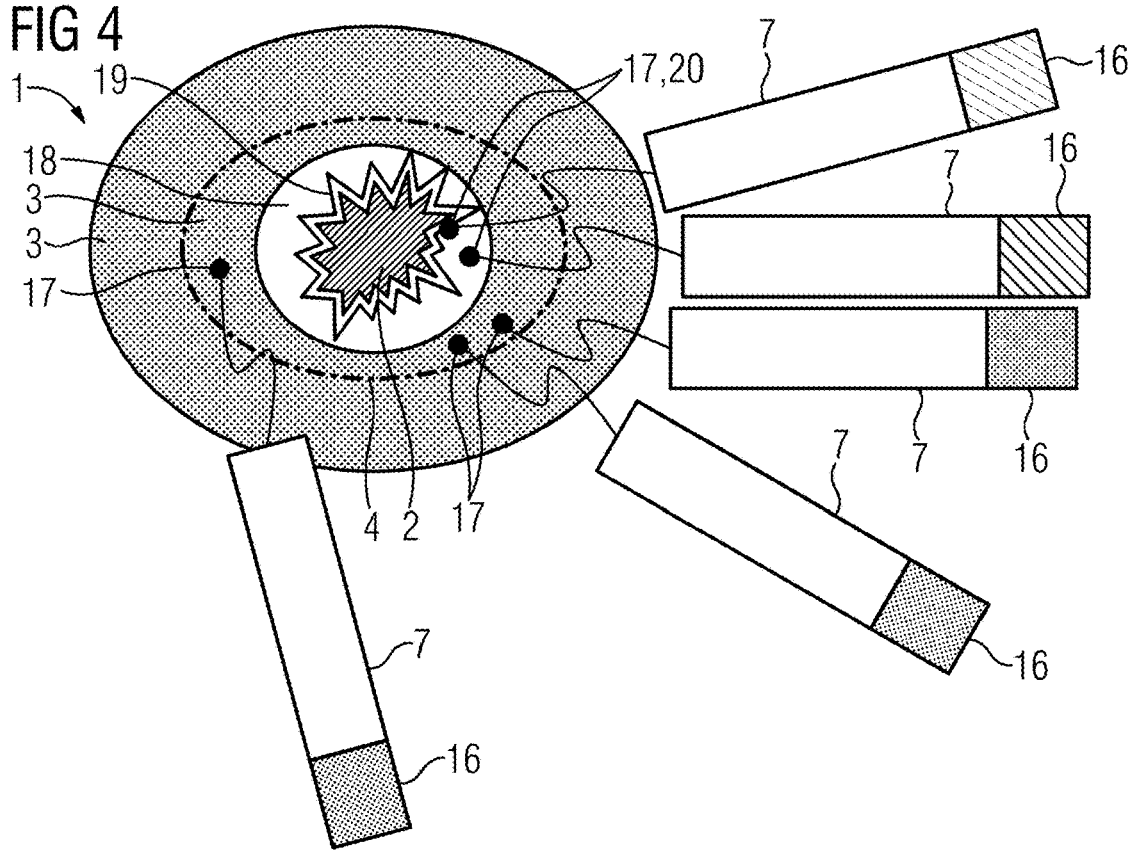

METHOD AND ANALYSIS DEVICES FOR CLASSIFYING TISSUE SAMPLES

This application claims the benefit of EP 18162285.3, filed on Mar. 16, 2018, which is hereby incorporated by reference in its entirety.

BACKGROUND

The present embodiments relate to classifying tissue samples with respect to at least one property.

It is common medical practice to remove diseased tissue parts or tissue regions from a patient. However, during this procedure, the physician in charge is faced with the problem of finding the boundaries of the respective affected tissue region. The ideal would be only to remove affected or diseased tissue. However, especially with tumors, it is of particular importance that such tissue is completely removed. For this reason, it is usual to provide a safety zone around the tumor or the affected tissue region and to remove all the tissue lying inside this safety zone. One drawback of this is that a significant proportion of healthy tissue is also removed.

The article "Deep Learning as a tool for increased accuracy and efficiency of histological diagnosis," Sci. Rep. 6, 26286 by Geert Litjens et al.; DOI: 10.1038/srep26286 (2016) examines the use of a neural network for the diagnosis of prostate and breast cancer.

SUMMARY AND DESCRIPTION

The scope of the present invention is defined solely by the appended claims and is not affected to any degree by the statements within this summary.

The present embodiments may obviate one or more of the drawbacks or limitations in the related art. For example, T more reliable tissue classification compared to the prior art is enabled.

A method according to the present embodiments is used for classifying tissue samples. Herein, a tissue sample in this context is biological material (e.g., including one or more cells) that has been removed from a body (e.g., a patient). In the method, annotated training data is generated from at least one known positive tissue sample that has a specified property and at least one known negative tissue sample that does not have the specified property. Herein, the positive and negative tissue samples originate from one and the same patient. The annotated training data is then provided to an automatic classifier.

Herein, annotated training data is training data that is provided with a marking, a description, or a label that explicitly indicates whether or not the tissue sample on which the respective training data is based has the specified property. Herein, the training data may constitute or include the actual tissue samples. However, the training data may also be generated or obtained from the tissue samples by one or more processing acts. These may, for example, include or be preparation, coloring, treatment (e.g., chemical or physical), optical detection (e.g., photographing or scanning), and/or the like. Therefore, the annotated training data may be of a purely electronic nature or equally well include physical objects. For example, to generate the annotated training data, a tissue sample may be chemically prepared and arranged on a slide for microscopic detection, and a corresponding positive or negative annotation may be entered in an assigned input or data field or database.

According to the present embodiments, the classifier is trained patient-specifically using the annotated training data to identify for the same patient, from whom the known positive and negative tissue samples originate, whether a tissue sample from this patient has the specified property. To delimit a tissue region affected by the specified property, input data for the classifier is generated from a plurality of unknown tissue samples originating from the same patient from whom the known tissue samples originate. Herein, the unknown tissue samples are tissue samples for which, prior to classification by the classifier, it is not known whether the tissue samples have the specified property. The unknown tissue samples are then automatically classified with respect to the specified property using the input data generated therefrom by the classifier. Herein, the input data is generated from the unknown tissue samples in a similar manner to the generation of the training data from the known positive and negative tissue samples (e.g., the known tissue samples), where, however, the input data is not given or assigned a positive or negative annotation or marking in advance (e.g., before classification by the classifier).

The automatic classifier used for the present embodiments uses (e.g., is based on) a machine-learning method. However, the system used in this case is not one that has already been fully and completely trained prior to productive use. Instead, a particular advantage of the present embodiments is that the classifier is trained or post-trained patient-specifically and individually (e.g., is adjusted or adapted to a specific patient before the unknown tissue sample taken from precisely this individual patient is classified). Herein, this individualized adjustment or adaptation (e.g., the patient-specific training of the classifier using the annotated training data) may be performed during or parallel to an operation or an intervention on the same patient (e.g., intraoperatively).

Since tissue changes, tumors and the like may be very diverse and individually manifested, this patient-specific, individualized adaption of the classifier achieves improved reliability of the classification of unknown tissue samples from the same patient. As a result of this improved, more reliable or more precise classification and the option of classifying the unknown tissue samples online (e.g., during the operation or during the intervention; within a few seconds), the respective physician in charge is advantageously enabled to delimit the affected tissue region more precisely. Hence, the present embodiments make it possible for the amount of healthy tissue surrounding the affected tissue region to be reduced on the resection or surgical removal thereof. In other words, the present embodiments thus facilitate gentler treatment, with which less healthy (e.g., unaffected) tissue is removed without this resulting in increased risk.

The specified property may, for example, be described or defined as the presence or existence of a pathological change on or in the respective tissue sample. Herein, it is possible for specific properties such as, for example, discoloration, the presence and/or spatial distribution and/or density of certain specified structures, a specific shape (e.g., of a cell or part of a cell or a group of cells), or the like to be defined and specified. However, the classifier is also independently able to learn relevant properties and differences between affected (e.g., positive) tissue samples and healthy (e.g., unaffected) negative tissue samples.

To this end, in a development, the classifier includes adaptable parameters (e.g., a neural network, a non-linear polynomial function, and/or a fuzzy logic system) that are adjusted in dependence on the training data for processing the input data (e.g., automatically). Therefore, the training data and the input data are, for example, classified by the classifier using a neural network. In other words, therefore, the classifier constitutes or includes, for example, at least one neural network that is trained or will be trained to classify the input data with respect to the specified property using the training data. Adaptation of the parameters provides, for example, the adjustment of respective values or magnitudes of the parameters. The use of, for example, the neural network may enable the achievement of particularly fast and reliable classification, where the classification of each of the unknown tissue samples and the annotation of the known positive and negative tissue samples may be performed with particularly little effort. The neural network may, for example, be a convolutional neural network (CNN). In one embodiment, the neural network may be a deep neural network (e.g., include one or more hidden layers of neurons). This enables particularly precise classification of even complex training and input data to be achieved.

In a development, the adaptable parameters (e.g., the neural network, the non-linear polynomial function, and/or the fuzzy logic system) are pretrained using a large amount of annotated training data from a large number of different patients and post-trained using the positive and negative tissue samples patient-specifically for the respective patients from whom the unknown tissue samples for subsequent classification originate. In other words, therefore, the adaptable parameters (e.g., the neural network) are adapted (e.g., adjusted) using the known positive and negative tissue samples from the specific patient without using new random parameters for each new patient from whom respective unknown tissue samples are to be classified (e.g., without the neural network being reinitialized with random parameters or weights). This procedure may be advantageous since, due to the large amount of training data originating from the large number of different patients, it is possible to avoid bias in the values or magnitudes of the parameters or, for example, the neural network or the unintentional training of irrelevant properties of the tissue samples in a particularly reliable manner. Therefore, the pretraining of, for example, the neural network with the training data originating from the large number of different patients may take place before the productive use of the neural network. The patient-specific adaptation or post-training of, for example, the neural network using the known positive and negative tissue samples from the respective patient from whom the unknown tissue samples for subsequent classification also originate in the current application in each case is performed during productive use (e.g., intraoperatively during or parallel to an operation or an intervention on precisely this patient). In this way, it is possible to combine particularly extensive training of the neural network with the advantageous individualized, patient-specific adaptation of the neural network (e.g., within a time that enables patient-specifically adapted classification; classification matched or adjusted to the individual patients to be treated during or parallel to treatment of the respective patient; during one single treatment session).

In a development, the adaptable parameters (e.g., the neural network, the non-linear polynomial function, and/or the fuzzy logic system) are exclusively trained using training data generated in each case from a plurality of known positive and known negative tissue samples from the same patient from whom the unknown tissue samples for subsequent classification also originate. In other words, therefore, the parameters or, for example, the neural network are exclusively trained using or based on tissue samples from a single patient and corresponding training data. This enables the, for example, neural network to be trained particularly precisely in individual properties or peculiarities of the respective patient, which otherwise (e.g., in the case of training using tissue samples from a large number of different patients) may be lost or averaged out. Since tumors and other histological manifestations may differ individually from patient to patient, this enables a particularly reliable differentiation to be made between affected and healthy tissue samples (e.g., particularly precise and reliable classification). Nowadays, specialized computer chips and processor apparatuses are available that enable such patient-specific, individualized training even during the typical duration of an operation or a medical intervention (e.g., within a few hours). In this embodiment of the method, therefore, it is possible initially to use random parameters or parameter values (e.g., the neural network may be initialized with random parameters or weights and then adapted or trained exclusively based on tissue samples or training data obtained from a single patient). This may also be advantageous with respect to confidentiality and data security of medical data since it is not necessary to use any medical data from other patients for training the neural network for the respective individual patients.

In a development of the method, to generate the training data and the input data, the respective tissue samples (e.g., the tissue samples on which the training data and the input data are based in each case) are optically detected. The training data and the input data are then analyzed by image processing for classification by the classifier. In other words, therefore, the classifier does not process the actual tissue samples themselves, but image data from the tissue samples obtained or generated by the optical detection thereof. For this, it is, for example, possible to use a camera. Depending on the technical requirements, the camera may, for example, be combined or coupled with a microscope. Herein, classification based on data processing of image data from the tissue samples may be performed particularly simply and quickly. Likewise, compared to processing of the tissue samples themselves, the complexity of a corresponding analysis device including the classifier may be reduced since, for example, it is not necessary to take account of requirements relating to the handling of biological material. Herein, the image processing may include, for example, processing by a neural network as well as conventional image processing steps (e.g., algorithmic edge detection, segmentation, and/or the like).

In a development, to generate the training data, a tissue sample from a central region of a tumor is processed as the known positive tissue sample and a tissue sample from an environment of the tumor is processed as the known negative tissue sample. Tissue samples for which the sampling locations have a shorter spatial distance to a sampling location of the known positive tissue sample than a sampling location of the known negative tissue sample are processed as the unknown tissue samples. In other words, therefore, the input data is based on tissue samples with sampling locations arranged between the sampling locations of the known positive and the known negative tissue samples. This enables a boundary of the tumor and hence, an extent (e.g., the extent or size of the affected tissue region) to be identified particularly accurately and precisely.

In a development, an image of the affected tissue region and an unaffected environment of the affected tissue region with respective image coordinates of sampling locations of the classified tissue samples (e.g., the sampling locations of the known positive and negative tissue samples) is provided to an analysis device electronically (e.g., by an electronic device). On the basis of this, the analysis device automatically ascertains an estimated extent of the affected tissue region. The estimated extent is automatically visualized in the image by the analysis device (e.g., depicted graphically or marked). The image then, therefore, depicts the affected regions and an unaffected, surrounding tissue region (e.g., therefore, a region of an organ that is larger than the respective tumor).

The estimation of the extent or size of the affected tissue region (e.g., the tumor) may be based on a prespecified algorithm. The analysis device may, for example, access a provided medical database containing typical tumor sizes, data on the respective patient, and the like. The extent may also be estimated or ascertained in dependence on respective results of an analysis of the tissue samples and/or image processing of images or image data from the tissue samples. Herein, the respective classification (e.g., a result or output) may take account of classifier data. For example, at least one further biological or histological property or a magnitude of a biological or histological parameter may be determined for each of the tissue samples. On the basis of this, it is then, for example, possible to estimate automatically whether the respective tissue sample originates from a central region or a marginal region of the respective tumor, for example.

To this end, for example, a size, number or density of blood vessels may be determined and compared with typical values or sizes from different regions of a tumor and/or surrounding tissue. The visualization of the ascertained estimated extent may, for example, be implemented by inserting or superimposing a corresponding marking on a screen or display device simultaneously with the image of the affected tissue region and an environment of the affected tissue region.

This visualization may be iteratively adjusted for each classified tissue sample in order to achieve a gradually improved estimation of the actual extent of the affected tissue region. The ascertainment and visualization of the estimated extent of the affected tissue region may assist the respective physician in charge in the treatment of the patient. For example, in connection with the classification of a plurality of unknown tissue samples of the patient, it is thus possible in a particularly reliable manner to achieve a reduction in the amount of healthy tissue that would otherwise be removed unnecessarily.

In a development, an image of the affected tissue region and an unaffected environment of the affected tissue region with respective image coordinates of sampling locations of the classified tissue samples is provided to an analysis device electronically (e.g., by an electronic device) and, on the basis thereof, the analysis device automatically ascertains at least one suggestion for a sampling location for a further unknown tissue sample for delimiting the affected tissue region and outputs this to a user. The analysis device may, for example, make use of a provided database in which, for example, typical shapes, sizes, growth directions, and the like of tumors are stored. As described in connection with the ascertainment of the estimated extent of the affected tissue region, herein it is also possible to take account of further data or magnitudes.

The analysis device is in each case able to take account iteratively of sampling locations of the tissue samples classified up to the respective time point for the next suggestion in each case. In this way, it is, for example, possible, by an algorithm, to achieve a gradual delimitation of the affected tissue region based on objective criteria or data. This may have the result that the affected tissue region maybe determined particularly accurately, precisely, quickly, and with a minimum number of tissue samples.

A further aspect relates to an analysis device for classifying tissue samples. The analysis device includes an input interface for receiving training data and input data generated from tissue samples. The analysis device further includes an automatic classifier for classifying the tissue samples with respect to a specified property by processing the training data and the input data. The analysis device also includes an output apparatus for outputting corresponding respective classifications. The classifier may, for example, be the classifier described in connection with the method according to the present embodiments.

The output apparatus may, for example, include optical and/or acoustic output devices (e.g., a screen, one or more lighting devices, a speaker, and/or the like). According to the present embodiments, the analysis device is configured, based on an image of a tissue region partially affected by the specified property and assigned image coordinates of already classified tissue samples from this tissue region, to automatically ascertain an estimated extent of a subregion of the tissue region affected by the specified property and to display the estimated extent in the image. Therefore, this analysis device according to the present embodiments may be configured to carry out the corresponding method according to the present embodiments.

A further aspect relates to an analysis device for classifying tissue samples including an input interface for receiving training data and input data generated from tissue samples, an automatic classifier for classifying the tissue samples with respect to a specified property by processing the training data and the input data, and an output apparatus for outputting corresponding respective classifications of the tissue samples. This analysis device according to the present embodiments is configured, based on an image of a tissue region partially affected by the specified property and assigned image coordinates of already classified tissue samples from this tissue region, to automatically ascertain and output a suggestion for a sampling location for a further tissue sample for delimiting (e.g., localizing) an affected part of the tissue region. Therefore, this analysis device, according to the present embodiments, may, for example, be configured to carry out the corresponding method.

An analysis device according to the present embodiments may be embodied as a hand-held device (e.g., in miniaturized form). The analysis device may include a sensor apparatus. This sensor apparatus may, for example, include the camera and/or at least one optical, acoustic, electric, and/or chemical sensor to detect the respective tissue samples (e.g., therefore, also to generate the training and/or input data). The sensor apparatus may be arranged in a tip or an end piece of the hand-held analysis devices. Herein, the tip or the end piece may be connected to a handle or a body of the analysis device. Electronic apparatuses and circuits for data processing may thus, for example, be arranged in the handle or body.

In a development, the histological information is combined with the image data from a medical imaging device (e.g., a C-arm X-ray device). It is, for example, possible for the tissue in question to be segmented in a 3D image recorded before the reception and processing of histological information (e.g., in a computed tomography image). The coordinate system of the 3D image of the segmented tissues is then registered with the coordinate system of the imaging device. This enables the segmented tissue in the 3D image, or the position or contour thereof, to be inserted or superimposed in the image data of the imaging device.

The histological information is now additionally inserted in the pre-interventional 3D image data and the image data of the imaging device that have been consolidated in this way (e.g., as color-coded punctiform information; in a traffic-light color scheme).

The continuously acquired histological results may be spatially assigned to the 3D image data or the image data of the imaging device. Therefore, one precondition is the ability to be able to localize the tip of the tissue-sampling instrument (e.g., the point of the sampling). The localization may, for example, be performed by a position sensor with magnetic or optical tracking, or the localization may be performed using the image data of the imaging device. The tissue-sampling instrument, the tissue classifier, is registered to the imaging device. It is then possible for tissue samples to be taken from the patient at the same time as imaging by the imaging device. As a result of the mutual registration, the position of the tissue classifier in the image data is known, and, due to the previous registration with the pre-interventional 3D image data, the position in the 3D image data is also known. The histological information ascertained in each case for every position may be inserted directly in the image data (e.g., using a traffic-light color scheme (insertion of colors, red for positive, green for negative, yellow for unclear)).

In another embodiment, the tissue-sampling instrument, the tissue classifier, may also be registered directly with pre-interventional 3D image data without using an imaging device. This registration then enables the respective histological information to be inserted directly into the pre-interventional 3D image data.

The combination of the position of a localizable tissue classifier with 2D or 3D image data from an imaging device, where the data may be pre-interventional or intra-interventional, enables the histological information to be inserted directly into the image data. This, for example, enables further tissue sampling positions to be planned more precisely and displayed for the performance of the respective sampling. For example, the analysis device may automatically ascertain a suggestion for a sampling location for a further unknown tissue sample using the position in the image data and output this suggestion to a user.

The features and properties of the analysis devices according to the present embodiments may also be united or combined in one single analysis device according to the present embodiments. The respective analysis device according to the present embodiments or the analysis devices according to the present embodiments may, for example, be the analysis device mentioned in connection with the method according to the present embodiments. The analysis device according to the present embodiments or the analysis devices according to the present embodiments may in each case include at least one data processing apparatus with at least one electronic data memory and at least one processor apparatus. The electronic data memory may, for example, be used to store a program code that may be executed by the processor apparatus and represents or codes the respective control instructions for the analysis device for carrying out the described measures or method acts during execution.

The properties and developments of the method according to the present embodiments disclosed above and in the following and the corresponding advantages may in each case be transferred analogously to the analysis devices according to the present embodiments and/or to the components and apparatuses that are used, or may be used to carry out the method according to the present embodiments and vice versa. Therefore, the present embodiments also include developments of the analysis devices with embodiments that are explicitly described only for the method in the respective combination and vice versa.

BRIEF DESCRIPTION OF THE DRAWINGS

FIG. 3 is a schematic diagram to illustrate exemplary training of a classifier; and FIG. 4 is a schematic depiction to illustrate exemplary improved delimitation of a tumor by a classifier.

DETAILED DESCRIPTION

In the exemplary embodiments described below, the described components in each case constitute individual features of the invention to be considered independently of one another. The described components in each case also develop the invention independently of one another and are thus to be regarded as part of the invention individually or in a different combination than that shown. The embodiments described may also be supplemented by further features from among the already described features of the invention.

Figure 1:
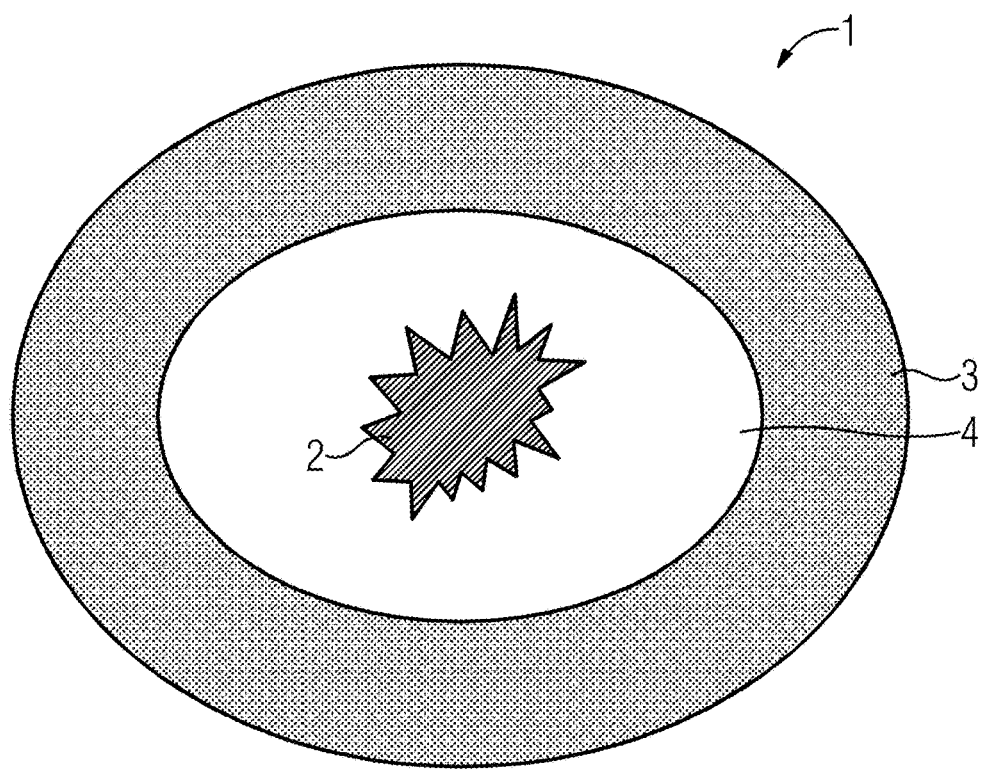
FIG. 1 is a schematic depiction of an exemplary tumor and surrounding healthy tissue.

FIG. 1 shows a schematic sectional view of a tissue region 1 with a central tumor 2 and surrounding healthy tissue 3.

In tumor resections or tumorectomies, the identification of the tumor boundaries is problematic. The tumor 2 is to be completely removed, but not too much healthy tissue 3 is to be cut out so that in each case the affected organ such as, for example, the liver is not damaged any more than necessary. According to the current prior art, not only the tumor 2, but also surrounding tissue of the tumor 2 may be removed in a safety zone 4.

Figure 2:
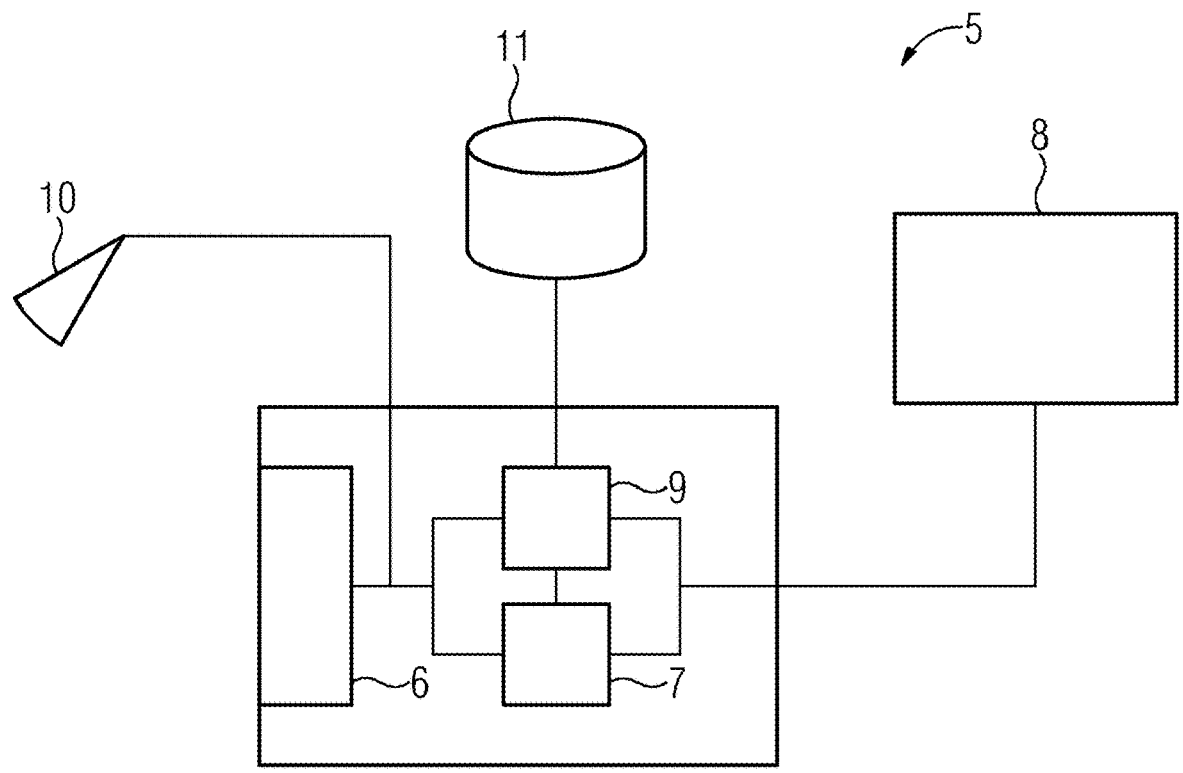
FIG. 2 is a schematic depiction of one embodiment of an analysis device for classifying tissue samples.

In order to remove as little healthy tissue 3 as possible (e.g., to reduce the size of the safety zone 4), a method for classifying tissue samples is used. At present, an analysis device 5 as shown schematically in FIG. 2 is used to this end. To this end, the analysis device 5 includes an input interface 6 for receiving training data and input data generated from tissue samples. This data is forwarded to an automatic classifier 7 of the analysis devices 5, which uses a neural network to classify the training and input data and hence the underlying tissue samples in each case with respect to at least one specified property. In this example, the property is whether the respective tissue sample is tumor tissue from the tumor 2 or healthy tissue 3.

First, the classifier 7 or the neural network thereof is trained. This training is illustrated schematically in FIG. 3. Herein, first, annotated training data is generated from tissue samples originating from the tissue region 1. Herein, the annotated training data is based on a plurality of known negative tissue samples 12 originating from the healthy tissue 3 and a plurality of known positive tissue samples 13 originating from the tumor 2. The annotated training data is provided to the classifier 7, which then, for example, supplies a series of incorrect classifications 14. Each incorrect classification 14 is followed by a respective parameter adjustment 15 during which the parameters or weights of the classifier 7 used for the classification are modified (e.g., automatically). Following a series of such parameter adjustments 15, the classifier 7 is finally sufficiently trained to supply (e.g., output) correct classifications 16 in each case for both the known negative tissue samples 12 and the known positive tissue samples 13. Herein, this training or adjustment process of the classifier 7 is performed individually for each patient to be treated (e.g., for the patient from whom the tissue region 1 originates). In this way, therefore, the classifier 7 is trained patient-specifically.

Again with reference FIG. 2, the classifications 14, 16 of the classifier 7 are output and displayed, for example on a display device 8.

Hence, in the present case, the classifier 7 is embodied as a learning system. The learning classifier 7 may be implemented by a non-linear function with a large number of parameters that are first randomly initialized before the training. The training works because the correct classifications 16 for the annotated training data based on the known negative and positive tissue samples 12, 13 are known in advance, and hence, a respective output or a respective result (e.g., the classifications 14, 16 supplied by the classifier 7) may in each case be compared with the desired, known target result. In the present case, the parameter adjustments 15 are implemented by a non-linear optimization method. Upon completion of the training, the classifier 7 is also able to classify unknown tissue samples correctly by processing the respective input data generated therefrom.

In the present case, the unknown tissue samples to be classified originate from the same patient from whom the known negative and known positive tissue samples 12, 13 used for the training or the adaptation of the classifier 7 also originate. Thus, it is possible to achieve an improved classification of, for example intraoperatively obtained, histological tissue samples that enable a more precise (e.g., closer resection of the tumor 2) that is gentler on the respective patient The patient-specific adaptation of the classifier 7 to precisely this patient and this patient's specific tumor 2 enables the sensitivity of the classifier 7 to be increased so that unknown tissue samples from the safety zone 4 may be correctly classified more reliably and more precisely. This is illustrated schematically in FIG. 4.

FIG. 4 is again a schematic depiction of the tissue region 1 with the tumor 2 and the healthy tissue 3. To delimit an actual size or extent of the tumor 2, the classifier 7 classifies a plurality of unknown tissue samples for which it is not at first known whether the plurality of unknown tissue samples originate from the tumor 2 or from the healthy tissue 3. Herein, these unknown tissue samples originate from different sampling locations 17 arranged between the center of the tumor 2 and the region of the healthy tissue 3 depicted in FIG. 1. Hence, a new safety zone 18 that is smaller (e.g., surrounds the tumor 2 more closely and hence includes less healthy tissue 3 than the larger safety zone 4 conventionally provided) may be defined.

In addition, in the present case, the analysis device 5 further includes a data processing apparatus 9 (see FIG. 2) (e.g., including one or more processors). In the present case, the data processing apparatus 9 is provided with an image of the tissue region 1 acquired by a camera 10 and the respective sampling locations 17 of the classified unknown tissue samples and the known negative and known positive tissue samples 12, 13. In addition, the data processing apparatus 9 is able to access a medical database 11. The medical database 11 may be entirely or partially a part of the analysis device 5. The database 11 may also be entirely or partially a part of an external server apparatus (e.g., a cloud server). In dependence thereon (e.g., based on the data provided), the data processing apparatus 9 ascertains an estimated extent 19 of the tumor 2 and also visualizes (e.g., depicts) this on the display device. In addition, the data processing apparatus 9 or the analysis device 5 outputs suggested sampling locations 20 for further unknown tissue samples for a further, more precise delimitation of the tumor 2 to a user (e.g., the respective physician in charge), for example.

Overall, the examples described show how the patient-specific adaptation of a learning classifier 7 and prompt intraoperative classification of tissue samples from the same patient can enable more precise, closer, and hence, gentler resection or surgical removal of diseased tissue.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for classifying tissue samples, the method comprising:
   generating annotated training data from at least one known positive tissue sample and at least one known negative tissue sample, the at least one known positive tissue sample having a specified property, the at least one known negative tissue sample not having the specified property, wherein the at least one known positive tissue sample and the at least one known negative tissue sample originating from a same patient,
   providing the annotated training data to an automatic classifier;
   identifying, for the same patient from whom the at least one known positive tissue sample and the at least one known negative tissue sample originate, whether a tissue sample from the same patient has the specified property, the identifying comprising training the automatic classifier patient-specifically using the annotated training data;
   delimiting a tissue region affected by the specified property from a plurality of unknown tissue samples originating from the same patient, it not being known whether the plurality of unknown tissue samples have the specified property, the delimiting comprising generating input data for the automatic classifier; and
   automatically classifying, by the automatic classifier, the plurality of unknown tissue samples with respect to the specified property using the input data.

2. The method of claim 1, wherein the automatic classifier comprises adaptable parameters,
   wherein the method further comprises processing the input data, the processing of the input data comprising adjusting the adaptable parameters in dependence on the annotated training data.

3. The method of claim 2, wherein the adaptable parameters comprise a neural network, a non-linear polynomial function, a fuzzy logic system, or any combination thereof.

4. The method of claim 2, wherein adjusting the adaptable parameters comprises automatically adjusting the adaptable parameters.

5. The method of claim 2, wherein the adaptable parameters are pretrained using an amount of annotated training data from a number of different patients and post-trained using the at least one known positive tissue sample and the at least one known negative tissue sample patient-specifically for the respective patients from whom the plurality of unknown tissue samples for subsequent classification originate.

6. The method of claim 2, wherein the adaptable parameters are exclusively trained using training data generated in each case from a plurality of known positive and known negative tissue samples from the same patient from whom the plurality of unknown tissue samples for subsequent classification originate.

7. The method of claim 1, wherein to generate the annotated training data and the input data, the respective tissue samples are detected optically, and the annotated training data and the input data are analyzed by image processing for classification by the automatic classifier.

8. The method of claim 1, wherein generating the annotated training data comprises:
processing a tissue sample from a central region of a tumor as a known positive tissue sample of the at least one known positive tissue sample;
processing a tissue sample from an environment of the tumor as a known negative tissue sample of the at least one known negative tissue sample; and
processing tissue samples for which sampling locations have a shorter spatial distance to a sampling location of the known positive tissue sample than a sampling location of the known negative tissue sample as the plurality of unknown tissue samples.

9. The method of claim 1, further comprising:
providing, by an electronic device, an image of the affected tissue region and an environment of the affected tissue region with respective image coordinates of sampling locations of classified tissue samples to an analysis device;
automatically ascertaining, by the analysis device, an estimated extent of the affected tissue region based on the respective image coordinates; and
automatically visualizing, by the analysis device, the estimated extent in the image.

10. The method of claim 1, further comprising:
providing, by an electronic device, an image of the affected tissue region and an environment of the affected tissue region with respective image coordinates of sampling locations of classified tissue samples to an analysis device;
automatically ascertaining, by the analysis device, a suggestion for a sampling location for a further unknown tissue sample for delimiting the affected tissue region based on the respective image coordinates; and
outputting the suggestion to a user.

11. An analysis device for classifying tissue samples, the analysis device comprising:
an input interface configured to receive annotated training data generated from tissue samples comprising at least one known positive tissue sample and at least one known negative tissue sample, the at least one known positive tissue sample having a specified property, the at least one known negative tissue sample not having the specified property, wherein the at least one known positive tissue sample and the at least one known negative tissue sample originating from a same patient;
an automatic classifier configured to identify, for the same patient, whether a tissue sample from the same patient has the specified property, therein training the automatic classifier patient-specifically using the annotated training data; and
an output apparatus configured to output corresponding respective classifications of the tissue samples,
wherein the analysis device is configured to provide the annotated training data to the automatic classifier,
wherein the analysis device is further configured to delimit a tissue region affected by the specified property from a plurality of unknown tissues samples originating from the same patient, it not being known whether the plurality of unknown tissues samples have the specified property, wherein the delimiting comprises a generation of input data for the automatic classifier, and
wherein the automatic classifier is configured to automatically classify the plurality of unknown tissue samples with respect to the specified property using the input data.

* * * * *